US010691792B2

(12) United States Patent
Kraemer et al.

(10) Patent No.: US 10,691,792 B2
(45) Date of Patent: *Jun. 23, 2020

(54) SYSTEM AND METHOD FOR PROCESS HOLLOWING DETECTION

(71) Applicant: Carbon Black, Inc., Waltham, MA (US)

(72) Inventors: Jeffrey Albin Kraemer, Wellesley, MA (US); Paul Matthew Drapeau, Mendon, MA (US)

(73) Assignee: Carbon Black, Inc., Waltham, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/026,945

(22) Filed: Jul. 3, 2018

(65) Prior Publication Data
US 2018/0316720 A1 Nov. 1, 2018

Related U.S. Application Data

(63) Continuation of application No. 15/457,734, filed on Mar. 13, 2017, now Pat. No. 10,043,000.
(Continued)

(51) Int. Cl.
*G06F 21/52* (2013.01)
*H04L 29/06* (2006.01)

(52) U.S. Cl.
CPC .......... *G06F 21/52* (2013.01); *H04L 63/1441* (2013.01); *H04L 63/1466* (2013.01)

(58) Field of Classification Search
None
See application file for complete search history.

(56) References Cited

U.S. PATENT DOCUMENTS

| 5,974,549 A | 10/1999 | Golan |
| 8,015,604 B1 | 9/2011 | Tidwell et al. |

(Continued)

FOREIGN PATENT DOCUMENTS

| EP | 2 750 069 | 7/2014 |
| GB | 2502774 | 12/2013 |

(Continued)

OTHER PUBLICATIONS

International Preliminary Report on Patentability, dated Sep. 27, 2018, from International Application No. PCT/US2017/022181, filed on Mar. 13, 2017. Eight pages.
(Continued)

*Primary Examiner* — Benjamin E Lanier

(57) ABSTRACT

A method and system for remediating a process hollowing intrusion on a user device comprising detecting a process starting on the user device, preparing the process to monitor Application Programming Interface (API) calls between the process and an operating system of the user device, determining whether the process is associated with a process hollowing intrusion based on information associated with the process and/or the API calls, and executing security policies against the process associated with the process hollowing intrusion. In examples, it is determined whether the child process is associated with a process hollowing intrusion in response to determining whether one or more API calls associated with known process hollowing intrusions modify executable memory of and/or modify an entry point address of the child process.

22 Claims, 4 Drawing Sheets

Related U.S. Application Data

(60) Provisional application No. 62/308,294, filed on Mar. 15, 2016.

(56) References Cited

U.S. PATENT DOCUMENTS

| | | |
|---|---|---|
| 8,839,435 B1 | 9/2014 | King |
| 9,165,142 B1 | 10/2015 | Sanders et al. |
| 9,336,385 B1 | 5/2016 | Spencer et al. |
| 9,648,045 B2 | 5/2017 | Mooring et al. |
| 2006/0277539 A1 | 12/2006 | Amarasinghe et al. |
| 2007/0150957 A1 | 6/2007 | Hartrell et al. |
| 2008/0144821 A1 | 6/2008 | Armstrong |
| 2009/0126017 A1 | 5/2009 | Chahal |
| 2009/0193513 A1 | 7/2009 | Agarwal et al. |
| 2010/0017879 A1 | 1/2010 | Kuegler et al. |
| 2010/0031361 A1 | 2/2010 | Shukla |
| 2010/0077481 A1 | 3/2010 | Polyakov et al. |
| 2013/0047255 A1 | 2/2013 | Dalcher |
| 2013/0283370 A1 | 10/2013 | Vipat et al. |
| 2014/0196148 A1 | 7/2014 | Chahal |
| 2015/0128274 A1 | 5/2015 | Giokas |
| 2015/0326592 A1 | 11/2015 | Vissamsetty et al. |
| 2015/0332048 A1 | 11/2015 | Mooring et al. |
| 2015/0334126 A1 | 11/2015 | Mooring et al. |
| 2016/0072836 A1 | 3/2016 | Hadden et al. |
| 2016/0164893 A1 | 6/2016 | Levi |
| 2017/0052821 A1 | 2/2017 | Wu et al. |
| 2017/0124327 A1 | 5/2017 | Kumbhar et al. |
| 2017/0270296 A1 | 9/2017 | Kraemer et al. |
| 2017/0272452 A1 | 9/2017 | Kraemer et al. |
| 2017/0272469 A1 | 9/2017 | Kraemer et al. |
| 2018/0091540 A1 | 3/2018 | Solow et al. |

FOREIGN PATENT DOCUMENTS

| | | |
|---|---|---|
| WO | WO 2015/009296 | 1/2015 |
| WO | WO 2017/003597 | 1/2017 |
| WO | WO 2017/160760 | 9/2017 |

OTHER PUBLICATIONS

International Preliminary Report on Patentability, dated Sep. 27, 2018, from International Application No. PCT/US2017/022167, filed on Mar. 13, 2017. Six pages.

International Preliminary Report on Patentability, dated Sep. 27, 2018, from International Application No. PCT/US2017/022173, filed on Mar. 13, 2017. Nine pages.

International Preliminary Report on Patentability, dated Sep. 27, 2018, from International Application No. PCT/US2017/022184, filed on Mar. 13, 2017. Eight pages.

Burger, E. et al., "Taxonomy Model for Cyber Threat Intelligence Information Exchange Technologies," Information Sharing & Collaborative Security, ACM, New York, Nov. 3, 2014, pp. 51-60. Ten pages.

Harrell, C., "Process Hollowing Meets Cuckoo Sandbox", Feb. 2015, Journey Into Incident Response, pp. 1-7.

Hunt, G. et al., "Detours: Binary Interception of Win32 Function," Proceedings of the 3rd USENIX Windows NT Symposium, Seattle, WA, Jul. 12-13, 1999. Ten pages.

International Search Report and the Written Opinion of the International Searching Authority, dated May 24, 2017, from International Application No. PCT/US2017/022181, filed on Mar. 13, 2017. Fourteen pages.

International Search Report and the Written Opinion of the International Searching Authority, dated May 26, 2017, from International Application No. PCT/US2017/022167, filed on Mar. 13, 2017. Twelve pages.

International Search Report and the Written Opinion of the International Searching Authority, dated May 8, 2017, from International Application No. PCT/US2017/022173, filed on Mar. 13, 2017. Sixteen pages.

International Search Report and the Written Opinion of the International Searching Authority, dated May 8, 2017, from International Application No. PCT/US2017/022184, filed on Mar. 13, 2017. Fifteen pages.

Leitch, J., "Process Hollowing," http://www.autosectools.com, Nov. 1, 2014. Ten pages.

Monti, E.,"Analyzing Malware Hollow Processes", Mar. 2011, Spiderlabs Blog, trustwave.com, pp. 1-12.

Nayyar, H., "An Opportunity in Crisis", 2014, SANS Institute, pp. 1-94.

VirtuaiAllocEx function, 2017, microsoft.com, pp. 1-6.

SYSTEM AND METHOD FOR PROCESS HOLLOWING DETECTION

RELATED APPLICATIONS

This application is a Continuation of U.S. patent application Ser. No. 15/457,734, filed on Mar. 13, 2017, which claims the benefit under 35 USC 119(e) of U.S. Provisional Application No. 62/308,294 filed on Mar. 15, 2016, both of which are incorporated herein by reference in their entirety.

BACKGROUND OF THE INVENTION

Data security threats pose a major operational and financial risk for individual persons and businesses. The threats typically occur due to attacks upon enterprise networks of businesses. Typically, the attacks utilize malicious computer software, or malware, that targets devices within the enterprise networks. In examples, the target devices include data communications equipment such as firewalls, user account databases, information servers, protocol routers, and user devices. Examples of user devices include smartphones, tablet computing devices, and laptop computers running operating systems such as Windows, Android, Linux, or IOS, in examples. Windows is a registered trademark of Microsoft Corporation. Android is a registered trademark of Google, Inc. IOS is a registered trademark of Apple, Inc.

Attack actors often use malware as a key component of their attacks upon devices in enterprise networks. The techniques or actions that the actors take when launching their attacks are also referred to collectively as Tools, Tactics, and Procedures (TTPs). Malware is often designed to disrupt network communications, gain control over computers or networks, or secretly gather personal information about users, businesses, and government entities. Malware typically includes viruses, trojans, adware, and spyware, to list a few examples. Analysis of TTPs and the malware utilized therein can provide useful information for attributing an attack to a specific actor, and to predict future attacks, in examples.

SUMMARY OF THE INVENTION

One of the TTPs in which actors utilize malware to breach the data of and access resources within target devices is a process hollowing intrusion attack upon the target devices. Process hollowing typically refers to the ability to replace (e.g. "hollow out") the original executable code of a process, also known as its executable image, with replacement executable code of a malicious nature. The replacement is typically orchestrated by malware that a user unwittingly downloads to their user device or that a threat actor injects into a process running on a target user device during a data security attack on the user device. A process that has been compromised by such an attack appears to be operating as an otherwise legitimate process but in fact is typically not executing any of its original code.

Businesses are increasingly utilizing data security systems to identify potential data security threats within their enterprise networks such as process hollowing attacks. The systems are typically deployed as a network-level service that monitors data traffic over the enterprise network and analyzes the data traffic for indicia of attacks. The systems can then send messages that include information concerning the potential attacks to security personnel such as incident responders via email or data logging via a Security Information and Event Manager ("SIEM"). From this information, the incident responders can take actions upon the user devices in response to the potential threats.

Current solutions for responding to threats such as process hollowing intrusion attacks have limitations. In one example, the systems typically detect the threats at the level of the enterprise network, not at the level of the target devices. It is often the case that multiple data breaches upon the target devices have often already occurred, over hours or perhaps even days, before the systems have identified the attack. In another example, the data security personnel typically carry out manual actions to remediate the process hollowing intrusions. The actions are often limited to device-level actions, such as a quarantine of an entire device by disabling its network connections or disabling its power. The security personnel then must either reinstall the operating system and its applications on the devices to ensure the integrity of the devices and the data of the devices, or further manually inspect each device to identify and remediate the affected processes, which increases cost.

In contrast, the present invention provides a data security system with the ability to automatically detect and remediate (e.g. block) process hollowing intrusions at the process level of the target user devices. Upon detecting these threats, the target user devices can then access security policies provided by an endpoint telemetry aggregation system of the data security system. The security policies include process-level remediation actions. The user devices can then execute the security policies to remediate the processes affected by the process hollowing intrusions. This enables the data security system to narrowly tailor its remediation and/or response to the affected process(es), while leaving the remaining processes and the overall target system otherwise intact and operational.

For this purpose, the present invention utilizes a process-level code interception technique provided by a runtime security agent process ("security agent") executing within each user device. The security agent injects executable detour code into each running process. The injected detour code intercepts key user level API calls, using trampoline techniques similar to that employed by the Microsoft "Detours" library, in one example. Detours is a library for intercepting arbitrary Win32 executable functions on x86 machines at run-time. The detour code of each process then sends information concerning the process and/or the API calls between the process and the operating system to the security agent. Based on the information concerning the process and/or the API calls between the process and the operating system, in examples, the security agent determines whether each process is associated with a process hollowing intrusion, and can remediate each affected process.

In general, according to one aspect, the invention features a method for remediating a process hollowing intrusion on a user device. The method comprises detecting a process starting on the user device, preparing the process to monitor Application Programming Interface (API) calls between the process and an operating system of the user device, determining whether the process is associated with a process hollowing intrusion based on information associated with the process and/or the API calls, and executing security policies against the process associated with the process hollowing intrusion.

The method determines whether the process is associated with a process hollowing intrusion based on information associated with the process and/or the API calls by detecting API calls that are associated with creating a child process of the process, and determining a possible existence of a process hollowing intrusion in response to determining that the child process has been created in a suspended state.

The method additionally or alternatively determines whether the process is associated with a process hollowing intrusion based on information associated with the process and/or the API calls by comparing the information associated with a child process of the process and/or the API calls to one or more attack patterns, wherein the attack patterns include one or more API calls associated with known process hollowing intrusions upon a target process and include operations that the API calls associated with the known process hollowing intrusions execute upon the target process, and determining that the information associated with the child process and/or the API calls match one or more of the attack patterns.

Preferably, the method determines whether the process is associated with a process hollowing intrusion based on information associated with the process and/or the API calls by determining whether a child process of the process is associated with a process hollowing intrusion in response to determining whether one or more API calls associated with known process hollowing intrusions modify executable memory of and/or modify an entry point address of the child process.

In one example, the method determines whether one or more API calls associated with known process hollowing intrusions modify executable memory of and/or modify an entry point address of the child process by detecting whether executable code of the child process has been removed from memory of the child process by one or more of the API calls.

In more detail, detecting whether executable code of the child process has been removed from memory of the child process by one or more of the API calls comprises detecting an API call accessing an entry point address of the child process, determining whether the entry point address has been modified; and/or tracking one or more API calls that unmap memory from a process to determine whether memory of the child process pointed to by the entry point address has been unmapped.

In another example, the method additionally or alternatively determines whether one or more API calls associated with known process hollowing intrusions modify executable memory of and/or modify an entry point address of the child process by detecting that new executable code has been injected and/or loaded into memory of the child process by one or more of the API calls.

Typically, detecting that new executable code has been injected and/or loaded into memory of the child process by one or more of the API calls comprises detecting one or more API calls associated with allocating new memory at an entry point address of the child process and detecting one or more API calls that map the newly allocated memory into the memory of the child process.

Also, detecting that new executable code has been injected and/or loaded into memory of the child process by one or more of the API calls comprises detecting one or more API calls that copy a virtual address of a file to an entry point address of the child process, and detecting one or more API calls that map the virtual address of the file into the memory of the child process.

In another example, the method determines whether one or more API calls associated with known intrusions modify executable memory of and/or modify an entry point address of the child process by detecting that executable code of the child process has been modified by one or more of the API calls.

Typically, detecting that executable code of the child process has been modified by one or more of the API calls can comprise detecting API calls that modify memory protection of the entry point address of the child process, which enables the executable code to be modified, and detecting API calls that write to one or more pages of memory that are mapped to the entry point address. The method can then additionally determine that a value written to the one or more pages of memory of the child process is an instruction executing a jump to executable memory allocated and modified in the process, the process being a parent of the child process.

Also, detecting that executable code of the child process has been modified by one or more of the API calls can comprise storing the entry point address of the child process to a first buffer in response to detecting creation of the child process in a suspended state, tracking an API call associated with returning a process to a running state from a non-running state to determine whether the child process has transitioned from its suspended state to a running state, storing the entry point address of the child process when in the running state to a second buffer, and comparing pages of memory pointed to by the entry point address of the child process within the first and second buffers to determine whether the memory pages have been modified.

In yet another example, the method determines whether one or more API calls associated with known intrusions modify executable memory of and/or modify an entry point address of the child process by detecting that a value of a next instruction pointer of the child process has been modified by one or more of the API calls.

Typically, detecting that a value of a next instruction pointer of the child process has been modified by one or more of the API calls comprises detecting API calls that allocate new memory for the child process, API calls that write a new executable image to the newly allocated memory, and API calls that modify the next instruction pointer of the child process to point to an entry point of the new executable image.

Also, detecting that a value of a next instruction pointer of the child process has been modified by one or more of the API calls comprises detecting API calls that map a virtual address of a file into memory of the child process, and API calls that modify the next instruction pointer of the child process to point to the virtual address of the file.

In general, according to another aspect, the invention features a system for remediating a process hollowing intrusion on a user device. The system comprises an endpoint telemetry aggregation system that stores security policies for remediating processes executing on the user device that are associated with the process hollowing intrusion. The system also comprises a security agent executing on the user device that detects a process starting on the user device, prepares the process to monitor Application Programming Interface (API) calls between the process and an operating system of the user device.

The security agent also receives information associated with the process and/or the one or more API calls, sent from the process, determines whether the process is associated with a process hollowing intrusion based on the information associated with the process and/or the API calls, and executes the security policies from the endpoint telemetry aggregation system against the process associated with the process hollowing intrusion.

In one example, the security agent determines whether the process is associated with a process hollowing intrusion based on the information associated with the process and/or the API calls by detecting one or more API calls modifying memory protection of an entry point address of a child process of the process, thereby enabling write access to the entry point address of the child process.

In another example, the security agent additionally or alternatively determines whether the process is associated with a process hollowing intrusion based on the information associated with the process and/or the API calls by determining whether new memory has been allocated for a child process of the process, at an entry point address of the child process, determining whether the newly allocated memory at the entry point address of the child process has been written to include an address that points to a new executable image, and/or tracking one or more API calls associated with mapping memory into a process to determine whether the address that points to the new executable image has been mapped into the memory of the child process.

In another example, the security agent additionally or alternatively determines whether the process is associated with a process hollowing intrusion based on the information associated with the process and/or the API calls by tracking one or more API calls that write to process memory of a process to determine whether the entry point address of the child process has been modified to include a virtual address of a file that includes new executable code, and tracking one or more API calls associated with mapping memory into the child process to determine whether the virtual address of the file including the new executable code has been mapped into the memory of the child process.

In yet another example, the security agent additionally or alternatively determines whether the process is associated with a process hollowing intrusion based on the information associated with the process and/or the API calls by determining whether new memory has been allocated for a child process of the process, detecting API calls that write a new executable image to the newly allocated memory; and detecting API calls that modify a next instruction pointer of the child process to point to an entry point of the new executable image.

In yet another example, the security agent determines whether the process is associated with a process hollowing intrusion based on the information associated with the process and/or the API calls by detecting API calls that map a virtual address of a file into memory of a child process of the process, and detecting API calls that modify a next instruction pointer of the child process to point to the virtual address of the file.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
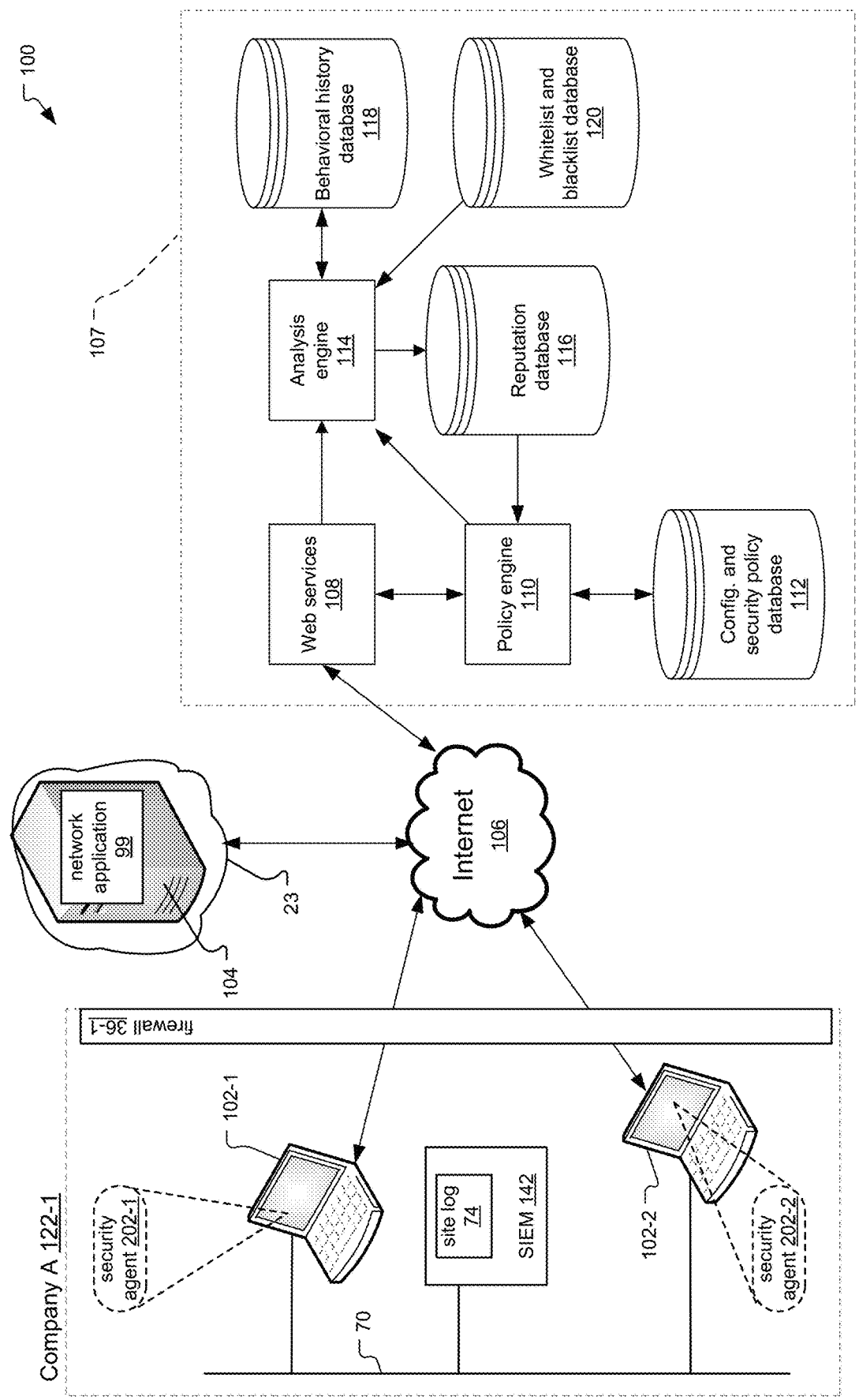
FIG. 1 is a schematic diagram of a distributed data security system that can identify and remediate process hollowing intrusion attacks on user devices, such as user devices within an enterprise network of a company or business, where security agents running on the user devices identify and remediate the process hollowing attacks at the process level on the user devices.

FIG. 1 shows a schematic diagram of an exemplary distributed data security system 100. The system 100 includes an endpoint telemetry aggregation system 107, and enterprise networks 70 of companies that communicate over the Internet 106. The system 100 determines whether process hollowing attacks upon user devices 102 within the enterprise networks 70 are occurring or have occurred.

A threat actor uses a network application 99 of the attack source device 104 to initiate the process hollowing intrusion attacks. The attack source device 104 is often located in a network 23 that is remote from the enterprise networks 70 of the companies upon which the threat actor launches the attacks.

In one embodiment, the endpoint telemetry aggregation system 107 is a Software as a Service ("SaaS") system located in a network that is remote to the enterprise networks 70 of the companies. The endpoint telemetry aggregation system 107 provides its services to one or more companies or business entities, which are clients of the endpoint telemetry aggregation system 107.

Processes are software applications that execute upon an operating system of the user devices 102. In modern operating systems such as Linux and Windows, the addressable memory/address space is usually divided into two sections, user space and kernel space. Processes created by users, also known as user programs, reside in user space. The core/critical functions of the operating system, also known as the kernel, reside in kernel space. Generally, the user space is reserved for user programs and the kernel manages processes, system memory, and hardware components of the user devices 102.

The system 100 determines whether the process hollowing attacks have occurred at a process level within the user devices, and remediates the processes determined to be associated with process hollowing intrusion attacks. A security agent 202 process executing within each user device 102 detects process hollowing intrusions associated with other processes executing on the user devices 102. To remediate processes which the security agent 202 determines are associated with process hollowing intrusions, the security agent 202 executes security policies provided by the endpoint telemetry aggregation system 107, in one example.

In a preferred embodiment, the security agent 202 is a user level process that determines whether process hollowing intrusions have occurred within other processes starting and executing upon an operating system of the user devices 102. For this reason, the system 100 is said to operate at the process level of the user devices 102.

In the illustrated example, enterprise network 122-1 of Company A includes user devices 102-1 and 102-2, each including security agents 202-1 and 202-2, respectfully. Within the enterprise network 122-1, the user devices 102 communicate with each other and with a Security Information and Event Manager (SIEM) 142 system over a local network 70. All communications exiting or entering the enterprise network 122-1 occur through a firewall 36-1.

In the illustrated embodiment, the endpoint telemetry aggregation system 107 includes a web services component 108, a policy engine 110, and an analysis engine 114. The web services component 108 receives requests for security policies from user devices 102 and forwards the requests to the policy engine 110. The policy engine 110, in turn, searches for the security policies in a configuration and security policy database 112 and a reputation database 116. The analysis engine 114 calculates trust (or reputation) scores to determine the trustworthiness of the processes and whether the processes are malicious or benign, in examples.

The endpoint telemetry aggregation system 107 also includes a behavioral information database 118 that stores behavioral information about applications received from user devices 102-1 and 102 and includes a whitelist/blacklist database 120 that stores records of whitelisted and blacklisted processes.

Figure 2:
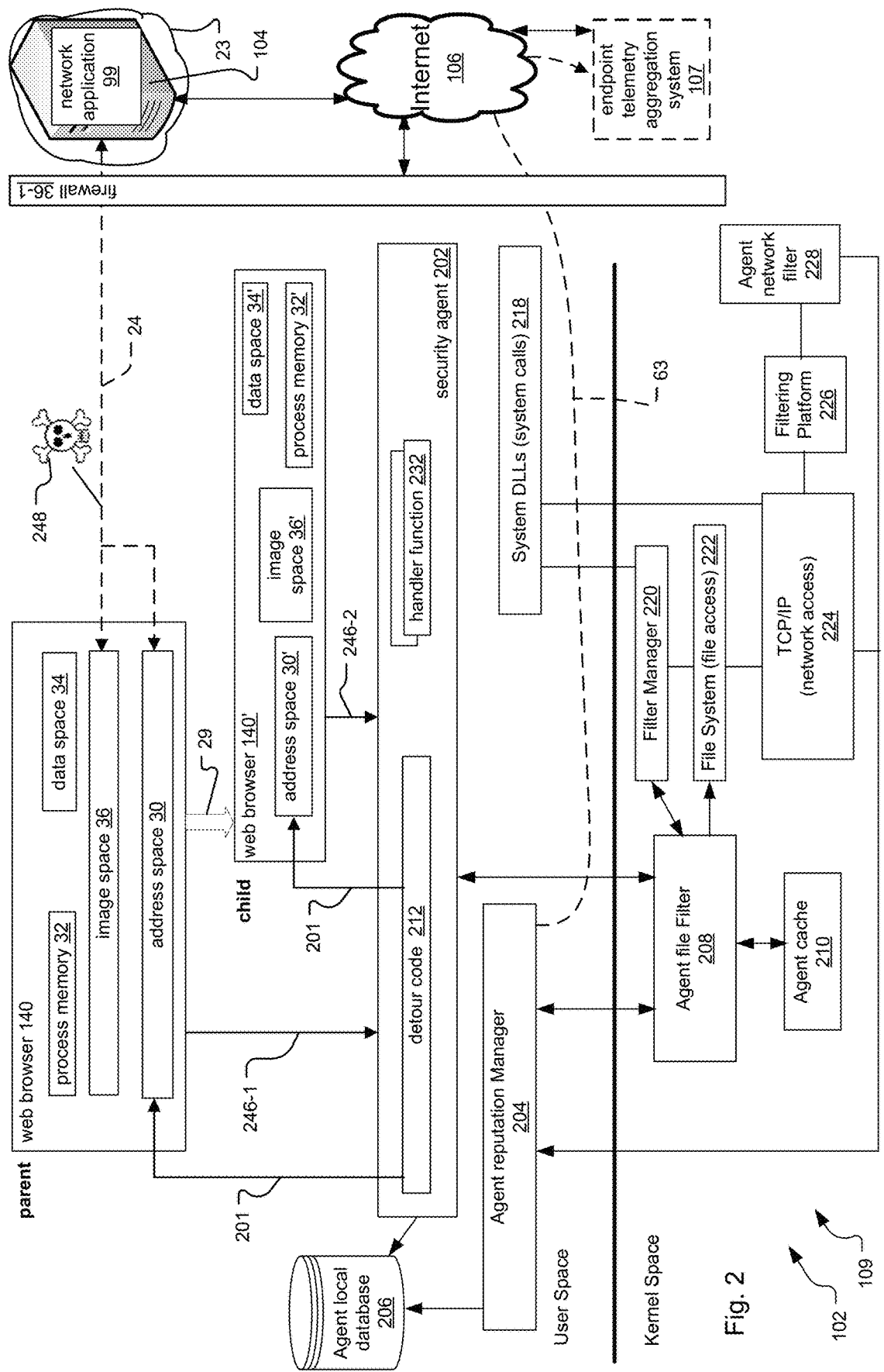
FIG. 2 is a schematic diagram showing a process-level representation of an operating system of an exemplary user device in an enterprise network, where the user device is a target of a process hollowing intrusion attack by an attack source device, and where the diagram also shows: typical interactions between processes on the user device and the attack source device during a process hollowing intrusion attack upon the processes of the user device; interactions between the security agent and other processes starting on the user device for enabling the security agent to detect process hollowing intrusion attacks; and interactions between the user device and an endpoint telemetry system that includes security policies that the security agent uses to remediate the processes associated with the process hollowing intrusions.

FIG. 2 provides details for interactions between exemplary processes starting on an operating system 100 of a user device 102 and a security agent 202 of the user device 102, when a likely process hollowing attack is launched upon the user device 102. The illustrated example is for a Windows-based operating system sold by Microsoft Corp.

Different operating systems generally have different kernels and different user spaces. Moreover, even different versions of the same operating system typically have different kernels. Thus, the way in which the kernel interacts with software of the user space and hardware of the user devices 102 is different. These differences must be factored by the endpoint telemetry aggregation system 107 because different operating systems, kernels, and user spaces will have different vulnerabilities, and malware programs that are dangerous for one may be harmless to another.

In the illustrated example for a Windows operation system 109, the user space includes exemplary web browser 140 process executing on the operating system 109 and system DLLs 218. The web browser 140 has process memory 32, data space 34, image space 36, and address space 30.

A security agent 202 is also running on the user device 102. An agent reputation manager 204 communicates with the security agent 202 and an agent local database 206 that is accessible in user space. The security agent 202 includes executable detour code 212 of a detour function. The security agent 202 can also include one or more handler functions 232, in some embodiments.

The agent reputation manager 204 requests security policies from the endpoint telemetry aggregation system 107, indicated by reference 63. The agent reputation manager 204 then stores the received security policies to the agent local database 206. Because the system DLLs enable user space processes to access resources in kernel space via public Application Programming Interfaces (APIs), the system DLLs are also known as API calls 218.

In the illustrated example, the kernel includes an agent file filter 208 and an agent cache 210, which are used to map filenames of applications to corresponding hashes and enforces security policies for applications and processes. The kernel further includes device drivers, which enable software programs to interact with hardware of the user devices 102. For example, a filter manager 220 provides functionality required by filter drivers to monitor and control resource requests made to the file system. The file system 222 manages and organizes how data are used by the operating system 109. Some examples of file systems 222 for Windows operating systems include File Allocating Table (FAT32) and New Technology File System (NTFS), to list some examples.

Filter drivers are often optional drivers that are able to modify the behavior of a device. On user devices 102 running an operating system 109 such as Windows, filter drivers can be implemented for both file and network access. In the case where access control or content filtering needs to be performed on a file, the filter driver sits between an application and the underlying file system and has the ability to scan or restrict access to files based upon enforced security policy. For example, the file filter driver prevents an application (or executable) from being read, loaded into memory or executed if the file hash been identified as being malware in one example. This is accomplished by returning an "Access Denied" status code to the calling application when an attempt was made to access the resource, in one example.

In one specific example, Microsoft Corp. has provided sample code (via the MSDN and the WDK documentation), which implements a variety of File System Minifilter Drivers. One such example, the SCANNER minifilter explains how a filter driver can detect a file access or file creation, scan the contents of the data looking for a "sample virus pattern" and report relevant information to a user level service daemon. This example shows how anti-virus/malware software can detect file access and scan the contents for virus signatures.

A TCP/IP driver 224 enables the user devices 102-1 to 102-n to have network access. The kernel further includes a filtering platform 226, which is a set of APIs and system services that provide features that can be used by packet processing or other connection monitoring services (e.g., firewalls). The kernel also includes an agent network filter 228, which is able to monitor and track all network connections made on a per process basis. If the application file's hash was flagged by a security policy, network connections may be denied or terminated on a per process basis by returning a failure code to a caller indicating the request to access the resource (in this case the network) is denied (or blocked).

The security agent 202 prepares each of the processes to monitor API calls 218 between each process and the operating system 109. For this purpose, the security agent 202 injects an instance of its executable detour code 212 into the address space 30 of each of the other processes as the other processes start on the user device 102. This injection is indicated by reference 201. The detour code 212 is loaded into process memory 32 before any executable code statements of the processes are loaded into process memory 32. When the processes execute, the detour code 212 of each process monitors and intercepts (but does not necessarily block or interrupt) API calls 218 that the processes make upon the operating system 109. This interception of the API calls 218 by the detour code 212 is also referred to as the detour code 212 "hooking into" the API calls 218.

In some embodiments, the detour code 212 then sends information 246 associated with the process and/or the API calls 218 to the security agent 202 for monitoring and analysis, and the detour code 212 then carries out execution of the intercepted API calls 218. Of the information 246, the information associated with each process includes references to each process (e.g. addresses of each process in memory) and to the parent process of each process, and the names and types of each process and parent process, in examples. Information associated with the API calls 218 includes: names and types of the API calls 218; a function pointer to each API call 218; parameters/arguments passed to the API calls 218; and the output of the API calls 218, in examples. When dereferenced, a function pointer can be used to invoke the function to which the function pointer points.

In the illustrated example, the security agent 202 injects detour code 212 into the address space 30 of web browser 140 after the web application 140 starts on the user device 102. The detour code 212 intercepts API calls between the web browser 140 and the operating system 109, and sends information 246-1 to the security agent 202 for monitoring and analysis. In a similar vein, when the web browser 140' child process starts on the user device 102, the security agent 202 injects detour code 212 into the address space 30' of web browser 140'. The detour code 212 intercepts API calls between the web browser 140' and the operating system 109, and sends call information 246-2 to the security agent 202 for monitoring and analysis.

In other embodiments, the detour code 212 of each process sends the call information 246 for the intercepted API calls 218 to the security agent 202 via one or more handler functions 232 of the security agent 202. For this purpose, in one implementation, the security agent 202 can create a separate handler function 232 within the security agent 202 for each process. In response to the detour code 212 of each process intercepting API calls 218 between the process and the operating system 109, the detour code 212 calls its corresponding handler function 232, which receives the call information 246 of the intercepted API call 218. In another implementation, one handler function 232 provides this same capability for multiple processes. The call to the handler function(s) 232 typically includes parameters/arguments such as a reference to the call information 246 and the name of a callback function of the detour code 212, in examples.

The security agent 202 can then monitor and analyze the API calls 218 between the process and the operating system 109 within the handler function 232 based on the information 246. The handler function 232 typically then executes a jump back to the detour code 212 of the process (e.g. callback), which in turn carries out the execution of the intercepted API call 218. In one example, when a process invokes a Windows CreateProcess( ) API, the injected detour code 212 of the process detects and hooks into the call, which intercepts the API call 218. The detour code 212 then calls the handler function 232 within the security agent 202, which tracks these API calls 218 and can execute security policies (e.g. block the process hollowing) to remediate the process hollowing intrusion. When the handler function 232 returns control back to the detour function 212, the detour code 212 then waits to detect another API call 218.

The security agent 202 includes business logic that analyzes the call information 246, and then executes a lookup of the security policies from the agent local database 206. The security agent 202 then executes the security policies to remediate processes affected by/associated with the detected process hollowing intrusions.

Returning to the illustrated example, a threat actor using a network application 99 of an attack source device 104 initiates a process hollowing intrusion attack on a target user device 102. A network application 99 is an application or process running on one host (here, attack source device 104) that provides a communication to another application running on a different host as a target device. The attack source device 104 is usually located on a network such as the Internet 106 or another network 23 that connects to the Internet 106 that is remote to the enterprise network 122 that includes the targeted user devices 102.

Threat actors can launch process hollowing intrusion attacks in different ways. In one scenario, the threat actor using a network application 99 on a remote attack source device 104 includes malware 248 as an attachment to an email message. A user of the user device 102 opens the email and unwittingly opens the attachment, which executes the malware on the user device 102. The malware 248, in turn, may attempt to open one or more unauthorized communication channels ("channel") 24 from the user device 102 back to the network application 99. In the illustrated example, malware 248 is injected into either the image space 36 or the address space 30 of the web browser 140. In another attack scenario, the network application 99 makes an otherwise authorized connection to a process on the user device 102, but then issues commands that somehow compromise the process (e.g. create a buffer overflow). The network application 99 then sends commands to the compromised process for establishing the channels 24 and obtaining the malware 248 from the network application 99. In yet another attack scenario, a web browser 140 executes a malicious script in a web page and the malicious script establishes the channels 24 and injects the malware 248.

Once the target process (here, the web browser 140) has been compromised, the malware 248 instructs the process to create a child process of the compromised web browser 140 in an initially suspended state. The creation of the child process is indicated by reference 29. The child process could be any other application, e.g. the desktop application explorer.exe. In this example the child is another instance of web browser 140' with process memory 32' and address/data/image spaces 30'/34'/36', respectively. The web browser 140 is also referred to as a parent process of its web application 140' child process.

For this purpose, the malware creates a new instance of the compromised process (i.e. creates a child process) with its execution thread in a suspended state. The created child process initially only contains the valid and uncompromised code associated with the child application. Because it is suspended, the child application has not begun to execute.

The malware includes instructions for replacing the original image of the child process with a replacement image, and often includes the replacement image as well. The replacement image is also usually malicious in nature, such as a "Bot" that steals credentials and files from the target device and provides the stolen information over the network connection 24 back to the network application 99 of the attack source device 104, in one example.

Figure 3:
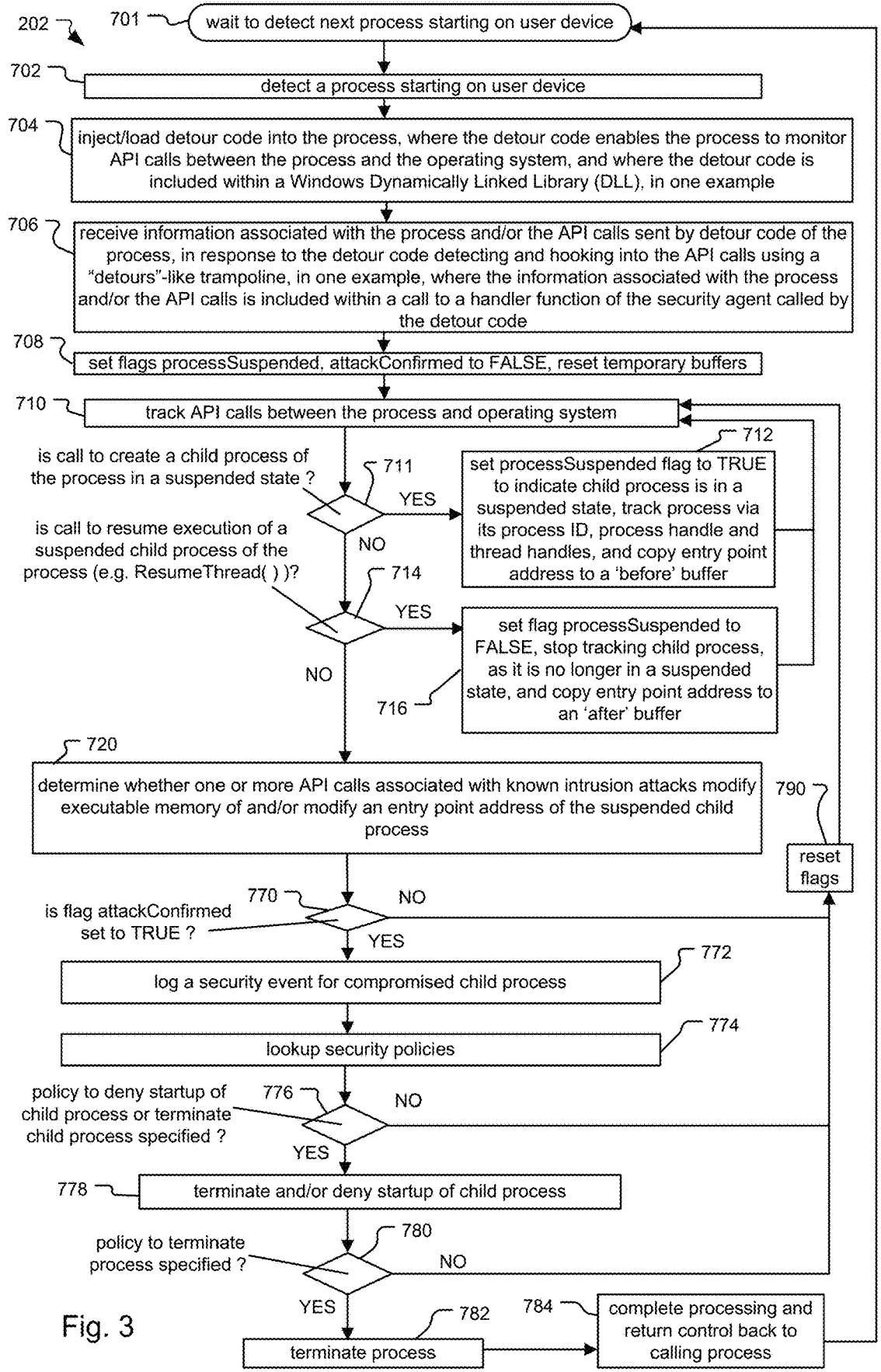
FIG. 3 is a flowchart showing a method of a security agent executing on a user device, where the security agent determines whether processes starting on the user devices are associated with process hollowing intrusion attacks, and remediates the processes associated with the process hollowing intrusions.

FIG. 3 shows a method of the security agent 202 of the system 100 for detecting and remediating process hollowing intrusions at a process level within a user device 102.

In step 701, the security agent 202 waits to detect the next process starting on the operating system 109 of the user device 102.

Steps 702 through 706, described herein below, collectively describe how the system 100 can detour API calls 218 between each process and the operating system 109 to the security agent 202 for monitoring and analysis.

In step 702, the security agent 202 detects a process starting on the user device 102. According to step 704, the security agent 202 injects or loads detour code 212 of a detour function into the process, where the detour code 212 enables monitoring of API calls 218 between the process and the operating system 109. In one example, the detour code 212 is included within a Windows Dynamically Linked Library (DLL). In another example, the detour code 212 is included within a shared library on a UNIX/Linux-based operating system 109.

In step 706, the security agent 202 receives information 246 associated with the process and/or the API calls sent by the detour code 212 of the process, in response to the detour code 212 detecting and hooking into API calls 218 between the process and the operating system 109. In some embodiments, the security agent 202 uses a "detours"-like trampoline that the security agent 202 establishes between the process and the detour code 212 of the process, in one example. The call to the handler function 232 includes information 246 associated with the process and/or the API calls 218 and a name of a callback function within the detour code 212, in another example.

In step 708, the security agent 202 sets flags "processSuspended" and "attackConfirmed" to false. The security agent 202 utilizes these flags to track whether the process is associated with a possible process hollowing intrusion and to minimize processing overhead when doing so. The security agent 202 also resets temporary buffers "before" and "after," which the security agent 202 uses to track modifications to executable code of the child process over time, in one example. Then, in step 710, the security agent 202 tracks API calls 218 between the process and the operating system 109.

According to step 711, the security agent 202 then determines if the API call 218 creates a child process of the process in a suspended state. For the Windows operating system 109, in one example, the security agent 202 detects a CreateProcessA/W( ) API call and determines if a new child process of the process has been created in a suspended state. If the result of step 711 is true, the method sets the processSuspended flag and tracks the process via its process ID, process handle and thread handles, in step 712.

The security agent 202 also copies the contents of an entry point address of the process to a "before" temporary buffer. The entry point of a process is the first address within the executable image of the process. By accessing the entry point address of a process and monitoring its value and/or changes to memory associated with the entry point address, the security agent 202 can detect actions (e.g. actions of possibly a malicious nature) upon the executable code of the process. If the result of step 711 is false, the method transitions to step 714.

In step 714, the security agent 202 determines if the API call 218 causes the suspended child process to resume execution. In one example, the call is ResumeThread( ) for a Windows operating system 109. If the result of step 714 is true, the method sets the processSuspended flag to false in step 716. The security agent 202 also copies the contents of the entry point address of the process to an "after" buffer. The method then transitions back to step 710 to track more API calls 218. If the result of step 714 is false, the method transitions to step 720.

In step 720, the security agent 202 determines whether one or more API calls 218 associated with known process hollowing intrusions modify executable code memory of and/or modify an entry point address of the suspended child process.

Figure 4:
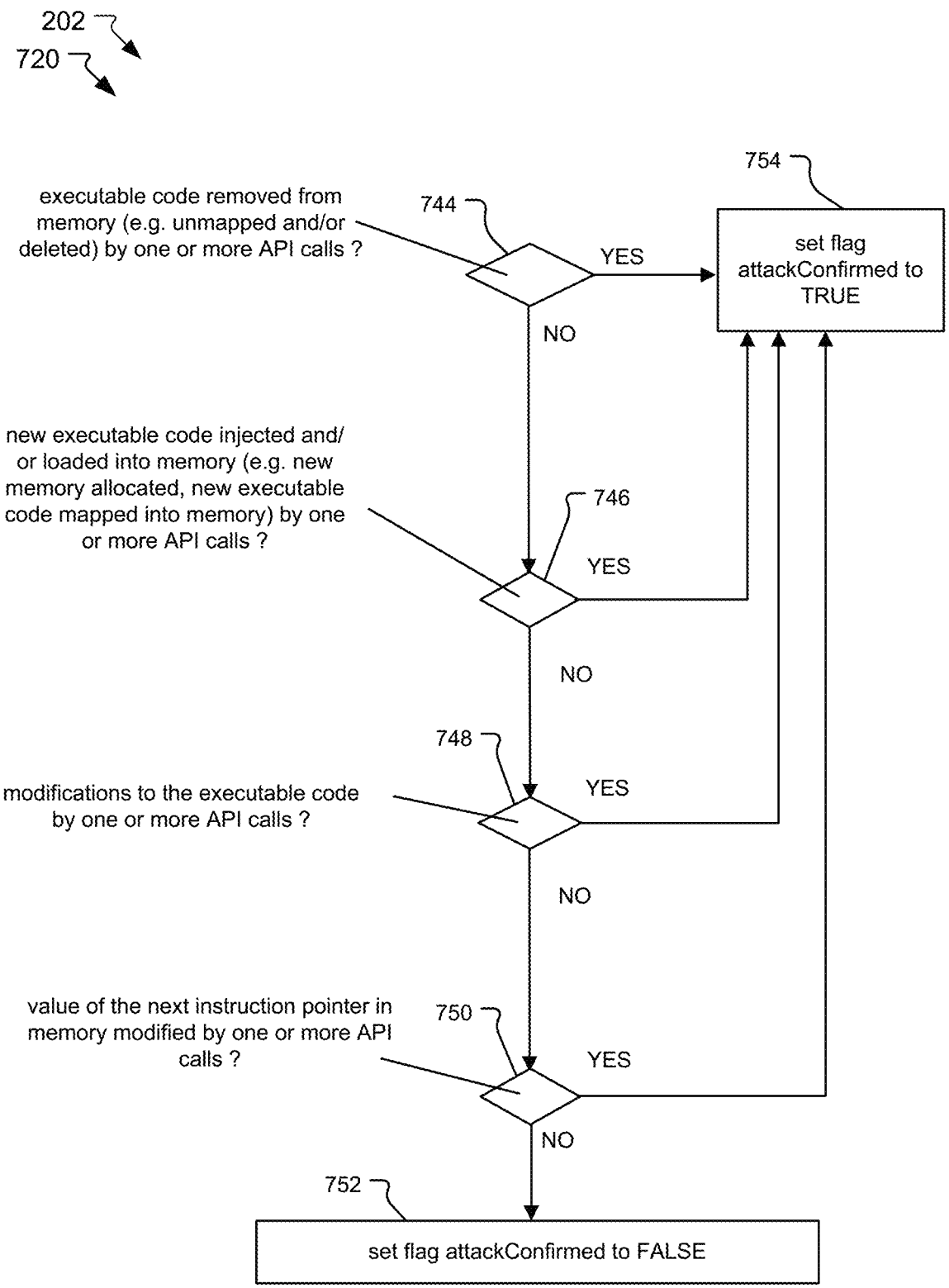
FIG. 4 is a flowchart that provides more detail for the flowchart of FIG. 3.

FIG. 4 provides more detail for step 720 of FIG. 3.

Steps 744 to 750 describe different exemplary attack signatures or patterns that are indicative of known process hollowing intrusions. The attack patterns include lists of API calls 218 and operations executed by the API calls 218 upon a target process during known and/or suspected process hollowing intrusions against the target process. In one implementation, the security agent 202 requests the attack patterns from the policy engine 110. In another implementation, the security agent 202 periodically polls the policy engine 110 for new attack patterns/updates to the patterns, or receives the patterns via a "push" operation from the policy engine 110. The security agent 202 saves the patterns to the agent local database 206, and can thereafter execute a local lookup of the attack patterns via the agent local database 206.

The security agent 202 compares the information 246 associated with the process and/or the API calls 218 and operations that the API calls 218 execute upon the process to each of the attack patterns. Upon determining an acceptable level of matching between the attack patterns and the API calls 218/operations by the API calls upon the child process, the security agent can conclude that the child process (and therefore the process compromised by the threat actor which created the child process) is associated with a process hollowing intrusion.

Though different combinations of API calls 218 among the attack patterns are possible, it is important to note that each of the exemplary attack patterns can independently indicate a process hollowing attack. Additionally, each of the attack patterns are further described hereinbelow with respect to the preferred embodiment of processes and API calls 218 for a Windows-based operating system 109.

In step 744, the security agent 202 compares the information 246 associated with the process and/or the API calls 218 to a first attack pattern. The first attack pattern determines whether executable code of the suspended child process has been removed from memory (e.g. unmapped and/or deleted) by one or more API calls 218. In one example, for the Windows operating system 109, the security agent 202 first detects the NtQueryInformationProcess( ) call to determine whether a Process Environment Block (PEB) base address of the suspended child process has been modified. The PEB is an internal Microsoft structure containing information concerning a process. The security agent 202 then accesses an ImageBase field within the PEB, where the ImageBase value is the entry point address of the process. Typically, the ImageBase is the address of the first byte of the executable code when it is loaded in memory.

The security agent 202 then tracks the NtUnmapViewOfSection( ) call and continues to monitor the value of the ImageBase to determine whether the memory pointed to by the ImageBase address has been unmapped from (i.e. removed from) the process by the NtUnmapViewOfSection( ) call. This effectively removes the executable code image from the memory of the process. Upon determining that the entry point/ImageBase address has been unmapped, the security agent 202 can conclude that a process hollowing intrusion associated with the suspended child process is occurring/has occurred and sets the "attackConfirmed" flag in response at step 754. Otherwise, the method transitions to step 746 for the security agent 202 to access and apply the next attack pattern.

In step 746, the security agent 202 compares the information 246 associated with the process and/or the API calls 218 to a second attack pattern. The second attack pattern determines whether new executable code has been injected and/or loaded into memory of the suspended child process. For this purpose, in a first example, the security agent 202 detects one or more API calls 218 associated with allocating new memory at the entry point address of the child process and one or more API calls 218 that map the newly allocated memory into the memory of the suspended child process. In a second example, the security agent 202 detects one or more API calls 218 that copy a virtual address of a file on disk to the entry point address of the child process and one or more API calls 218 that map the file into the memory of the suspended child process.

In the first example, the security agent 202 detects one or more API calls 218 associated with allocating new memory at the entry point address of the child process and one or more API calls 218 that map the newly allocated memory into the memory of the suspended child process. For the Windows operating system, in one example, the security agent 202 first detects a VirtualAllocEx( ) call to allocate new memory at the original ImageBase address. Then, the security agent 202 tracks one or more API calls 218 that copy and/or write into the newly allocated memory at the original ImageBase address, such as WriteProcessMemory( ). This suggests that a remote attacker may be injecting/loading new executable code into the process, such as a new executable code image that the remote attacker has included within the malware 248 over the attack channel 24.

Finally, to conclude that a remote attacker is injecting/loading new executable code into the process, the security agent monitors the NtMapViewOfSection( ) call to determine whether the newly allocated memory including the injected code has been mapped into the memory of the suspended child process. This effectively replaces the original executable code image of the process with the new executable code image allocated in memory.

In the second example, the security agent 202 detects one or more API calls 218 that copy a virtual address of a file on disk to the entry point address of the process and one or more API calls 218 that map the file into the memory of the suspended child process. The file is typically copied to the file system of the target user device 102 by the remote attacker and includes executable code of a replacement executable image that is malicious in nature. For the Windows operating system, in one example, the security agent 202 first detects VirtualProtectEx( ) and determines whether the API call has modified memory protection of the ImageBase (i.e. the entry point address of the executable code). Then, the security agent 202 tracks WriteProcessMemory( ) to determine if the API calls 218 have modified the entry point address.

Finally, to conclude that a remote attacker is injecting/loading new executable code into the process, the security agent 202 tracks NtMapViewOfFile( ) and determines whether the modified entry point address is the virtual address of the file specified in the NtMapViewOfFile( ) call. This effectively replaces the original executable code image of the process with the new executable code image located in the file.

Upon determining that a new executable image has been injected/loaded into the process in step 746, the security agent 202 sets the "attackConfirmed" flag in response at step 754. Otherwise, the method transitions to step 748 for the security agent 202 to access and apply the next attack pattern.

In step 748, the security agent 202 compares the information 246 associated with the process and/or the API calls 218 to a third attack pattern. The third attack pattern determines whether modifications to the executable code of the suspended child process have occurred. For this purpose, in a first example, the security agent 202 detects API calls 218 that modify memory protection of the entry point address, which enables the executable image to be modified, and then detects API calls 218 that write to one or more pages of memory that are mapped to the entry point address. This effectively modifies the contents of the original executable image. In a second example, rather than tracing API calls 218, the security agent 202 can determine whether modifications to the executable code of the suspended child process have occurred by tracing memory pointed to by the entry point address of the process for modifications to the memory over time.

In the first example, the security agent 202 detects API calls 218 that modify memory protection of the entry point address followed by calls that write to one or more pages of memory for the (now unprotected) entry point address. For the Windows operating system 109, in one example, the security agent tracks VirtualProtectEx( ) and determines whether the API call has modified memory protection of the ImageBase (i.e. the entry point address of the executable code). Then, the security agent 202 tracks WriteProcessMemory( ) and determines whether the call has modified the executable code at the entry point/ImageBase address. In one example, the modification could be an instruction to jump to other executable memory allocated and modified in the compromised process that created the suspended child process.

In the second example, the security agent 202 traces memory pointed to by the entry point address of the process for modifications to the memory over time. For this purpose, in one example, the security agent 202 can trace the memory in the "before" buffer over time for modifications, such as modifications to permissions of the memory (e.g. changes from 'read-only' to 'read-write'). In another example, the security agent 202 can compare the memory for the executable code in the "before" buffer against the memory for the executable code in the "after" buffer for differences. The "before" buffer includes the entry point address of the executable code during the initial creation of the suspended child process, while the "after" buffer includes the entry point address of the executable code that is actually executed by the process upon resuming execution of the process from its initially suspended state. Upon determining differences between the memory pages of the "before" and "after" entry point addresses, the security agent 202 can conclude that a process hollowing intrusion has modified the original executable image of the suspended child process.

Upon determining that the executable image of the suspended child process has been modified in step 748, the security agent 202 sets the "attackConfirmed" flag in response at step 754. Otherwise, the method transitions to step 750 for the security agent 202 to access and apply the next attack pattern.

In step 750, the security agent 202 compares the information 246 associated with the process and/or the API calls 218 to a fourth attack pattern. The fourth attack pattern determines whether a value of a next instruction pointer in memory of the suspended child process has been modified by one or more API calls 218. This can be accomplished by either modifying the EIP register (next instruction pointer for the target thread) or EAX register (which contains the pointer to the initial instruction to execute for the target application). For this purpose, in a first example, the security agent 202 detects API calls 218 that allocate new memory for the process, calls that write a new executable image to the newly allocated memory, followed by API calls that modify a next instruction pointer of the process to point to the base address/entry point of the new executable image. In a second example, the security agent 202 detects an API call 218 that maps a file into memory of the process, followed by API calls 218 that modify the next instruction pointer of the process to point to a virtual address of the file.

In the first example, the security agent 202 tracks one or more API calls 218 that allocate new memory for the child process, that write a new executable image to the newly allocated memory, followed by API calls that modify a next instruction pointer of the process to include (e.g. point to) the base address/entry point of the new executable image. For the Windows operating system 109, in one example, the security agent 202 tracks the VirtualAllocEx( ) API and identifies an address for the newly allocated memory. Unlike the "remove code" and "inject code" attack signatures, which allocate memory at the entry point address of the process, the memory allocation references a different address than the entry point address of the process.

The security agent 202 then tracks WriteProcess-Memory( ) and determines whether the call modifies the newly allocated memory. Finally, the security agent 202 tracks API calls 218 that modify the ThreadContext structure (e.g. via a call to SetThreadContext( ) in Windows) and determines whether the call has changed the next instruction pointer value to the base address of the new (malicious) executable code, the value of which is the address of the newly allocated memory. In one example, the SetThreadContext( ) call writes the value of the address of the new (malicious) code to the EIP or EAX register for Windows/x86 processor families, which modifies the instruction sequence to execute the new (malicious) code in the target process, instead of the legitimate application code.

In a second example, the security agent 202 detects an API call 218 that maps a file into memory followed by API calls 218 that modify the next instruction pointer of the process to point to a virtual address of the file. For the Windows operating system, in one example, the security agent 202 detects the NtMapViewOfFile( ) call to map a virtual address of a file into the memory of the suspended child process, followed by a call to SetThreadContext( ). Upon determining that the SetThreadContext( ) call has changed the next instruction pointer value of the suspended child process to be (e.g. to point to) the virtual address of the file, the security agent 202 can conclude that a process hollowing intrusion is associated with the suspended child process.

If the security agent 202 determines that the value of a next instruction pointer in memory of the suspended child process has been modified by one or more API calls 218, the security agent 202 sets the "attackConfirmed" flag to true at step 754. Otherwise, the method transitions to step 752, and the security agent 202 sets the "attackConfirmed" flag to false.

Upon conclusion of steps 752 and 754, the method ends analysis of the suspended child process and the method transitions back to the method of FIG. 3 at the conclusion of step 720.

Returning to FIG. 3, in step 770, the security agent 202 checks the value of the "attackConfirmed" flag. If the value of the "attackConfirmed" flag is false, the method transitions to step 790, which resets any flags and then transitions to step 710 to track more API calls 218. If the value of the "attackConfirmed" flag is true, the method transitions to step 772. In step 772, the security agent 202 logs a security event for the compromised child process. Then, in step 774, the security agent 202 executes a lookup of security policies provided by the endpoint telemetry aggregation system 107 for the compromised process associated with the process hollowing intrusion.

In step 776, the security agent 202 determines whether the policy specifies to terminate the child process or deny startup of the child process as a remediation measure, in examples. If this statement is false, the method transitions back to step 790 and then to step 710 to track more API calls 218. Otherwise, the method transitions to step 778, and executes the specified policies (e.g. terminate and/or deny startup of the child process). Then, in step 780, the security agent 202 determines whether the policy specifies to terminate the compromised process itself as a remediation measure. If termination of the compromised process is not specified, the method transitions back to step 790 and then to step 710 to track more API calls 218. Otherwise, the method transitions to step 782 to execute the specified policy (e.g. terminate the process).

Finally, in step 784, the security agent 202 completes any final processing and transitions back to step 701 to detect the next process starting on the user device 202. In one example, the final processing includes returning control back to the calling process, such as via a callback function provided by the detour code 212.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for remediating a process hollowing intrusion on a user device, the method comprising:
    detecting, by a security agent executing in user space on the user device, a process starting on the user device;
    preparing, by the security agent, the process to monitor Application Programming Interface (API) calls between the process and an operating system of the user device;
    determining, by the security agent, whether the process is associated with a process hollowing intrusion by one or more of the API calls by comparing pages of memory pointed to by respective entry point addresses of a child process prior to and post modification by the one or more of the API calls; and
    executing, by the security agent, security policies against the process associated with the process hollowing intrusion.

2. A method for remediating a process hollowing intrusion on a user device, the method comprising:
    detecting, by a security agent executing in user space on the user device, a process starting on the user device;
    preparing, by the security agent, the process to monitor Application Programming Interface (API) calls between the process and an operating system of the user device;
    determining, by the security agent, whether the process is associated with a process hollowing intrusion based on information associated with the process and/or the API calls; and
    executing by the security agent, security policies against the process associated with the process hollowing intrusion.

3. The method of claim 2, further comprising resetting, by the security agent, temporary buffers used by the security agent to track modifications to executable code of a child process, wherein determining whether the process is associated with a process hollowing intrusion based on information associated with the process and/or the API calls comprises:
    detecting API calls that are associated with creating the child process of the process; and
    determining a possible existence of a process hollowing intrusion in response to determining that the child process has been created in a suspended state.

4. The method of claim 2, wherein determining whether the process is associated with a process hollowing intrusion based on information associated with the process and/or the API calls comprises:
    comparing the information associated with a child process of the process and/or the API calls to one or more attack patterns, wherein the attack patterns include one or more API calls associated with known process hollowing intrusions upon a target process and include operations that the API calls associated with the known process hollowing intrusions execute upon the target process; and
    determining that the information associated with the child process and/or the API calls match one or more of the attack patterns.

5. The method of claim 2, wherein determining whether the process is associated with a process hollowing intrusion based on information associated with the process and/or the API calls comprises:
    determining whether a child process of the process is associated with a process hollowing intrusion in response to determining whether one or more API calls associated with known process hollowing intrusions modify executable memory of and/or modify an entry point address of the child process.

6. The method of claim 5, wherein determining whether one or more API calls associated with known process hollowing intrusions modify executable memory of and/or modify an entry point address of the child process comprises detecting whether executable code of the child process has been removed from memory of the child process by one or more of the API calls.

7. The method of claim 6, wherein detecting whether executable code of the child process has been removed from memory of the child process by one or more of the API calls comprises:
    detecting an API call accessing an entry point address of the child process;
    determining whether the entry point address has been modified; and/or
    tracking one or more API calls that unmap memory from a process to determine whether memory of the child process pointed to by the entry point address has been unmapped.

8. The method of claim 5, wherein determining whether one or more API calls associated with known process hollowing intrusions modify executable memory of and/or modify an entry point address of the child process comprises detecting that new executable code has been injected and/or loaded into memory of the child process by one or more of the API calls.

9. The method of claim 8, wherein detecting that new executable code has been injected and/or loaded into memory of the child process by one or more of the API calls comprises detecting one or more API calls associated with allocating new memory at an entry point address of the child process and detecting one or more API calls that map the newly allocated memory into the memory of the child process.

10. The method of claim 8, wherein detecting that new executable code has been injected and/or loaded into memory of the child process by one or more of the API calls comprises detecting one or more API calls that copy a virtual address of a file to an entry point address of the child process, and detecting one or more API calls that map the virtual address of the file into the memory of the child process.

11. The method of claim 5, wherein determining whether one or more API calls associated with known intrusions modify executable memory of and/or modify an entry point address of the child process comprises detecting that executable code of the child process has been modified by one or more of the API calls.

12. The method of claim 11, wherein detecting that executable code of the child process has been modified by one or more of the API calls comprises detecting API calls that modify memory protection of the entry point address of the child process, which enables the executable code to be modified, and detecting API calls that write to one or more pages of memory that are mapped to the entry point address.

13. The method of claim 12, further comprising determining that a value written to the one or more pages of memory of the child process is an instruction executing a jump to executable memory allocated and modified in the process, the process being a parent of the child process.

14. The method of claim 5, wherein determining whether one or more API calls associated with known intrusions modify executable memory of and/or modify an entry point address of the child process comprises detecting that a value of a next instruction pointer of the child process has been modified by one or more of the API calls.

15. The method of claim 14, wherein detecting that a value of a next instruction pointer of the child process has been modified by one or more of the API calls comprises detecting API calls that allocate new memory for the child process, API calls that write a new executable image to the newly allocated memory, and API calls that modify the next instruction pointer of the child process to point to an entry point of the new executable image.

16. The method of claim 15, wherein detecting that a value of a next instruction pointer of the child process has been modified by one or more of the API calls comprises detecting API calls that map a virtual address of a file into memory of the child process, and API calls that modify the next instruction pointer of the child process to point to the virtual address of the file.

17. A system for remediating a process hollowing intrusion on a user device, the system comprising:
   an endpoint telemetry aggregation system that stores security policies for remediating processes executing on the user device that are associated with the process hollowing intrusion, the endpoint telemetry aggregation system including one or more computing devices remote from the user device; and
   a security agent executing in user space on the user device that:
      detects a process starting on the user device;
      prepares the process to monitor Application Programming Interface (API) calls between the process and an operating system of the user device;
      receives information associated with the process and/or the one or more API calls, sent from the process;
      determines whether the process is associated with a process hollowing intrusion based on the information associated with the process and/or the API calls; and
      executes the security policies from the endpoint telemetry aggregation system against the process associated with the process hollowing intrusion.

18. The system of claim 17, wherein the security agent determines whether the process is associated with a process hollowing intrusion based on the information associated with the process and/or the API calls by:
   detecting one or more API calls modifying memory protection of an entry point address of a child process of the process, thereby enabling write access to the entry point address of the child process.

19. The system of claim 17, wherein the security agent determines whether the process is associated with a process hollowing intrusion based on the information associated with the process and/or the API calls by:
   determining whether new memory has been allocated for a child process of the process, at an entry point address of the child process;
   determining whether the newly allocated memory at the entry point address of the child process has been written to include an address that points to a new executable image; and/or
   tracking one or more API calls associated with mapping memory into a process to determine whether the address that points to the new executable image has been mapped into the memory of the child process.

20. The system of claim 17, wherein the security agent determines whether the process is associated with a process hollowing intrusion based on the information associated with the process and/or the API calls by:
   tracking one or more API calls that write to process memory of a process to determine whether the entry point address of the child process has been modified to include a virtual address of a file that includes new executable code; and
   tracking one or more API calls associated with mapping memory into the child process to determine whether the virtual address of the file including the new executable code has been mapped into the memory of the child process.

21. The system of claim 17, wherein the security agent determines whether the process is associated with a process hollowing intrusion based on the information associated with the process and/or the API calls by:
   determining whether new memory has been allocated for a child process of the process;
   detecting API calls that write a new executable image to the newly allocated memory; and
   detecting API calls that modify a next instruction pointer of the child process to point to an entry point of the new executable image.

22. The system of claim 17, wherein the security agent determines whether the process is associated with a process hollowing intrusion based on the information associated with the process and/or the API calls by:
   detecting API calls that map a virtual address of a file into memory of a child process of the process; and
   detecting API calls that modify a next instruction pointer of the child process to point to the virtual address of the file.

* * * * *